J. T. WHEELER.
AUTOMATIC BRAKE FOR TREAD-POWERS.
No. 174,600.
Patented March 7, 1876.
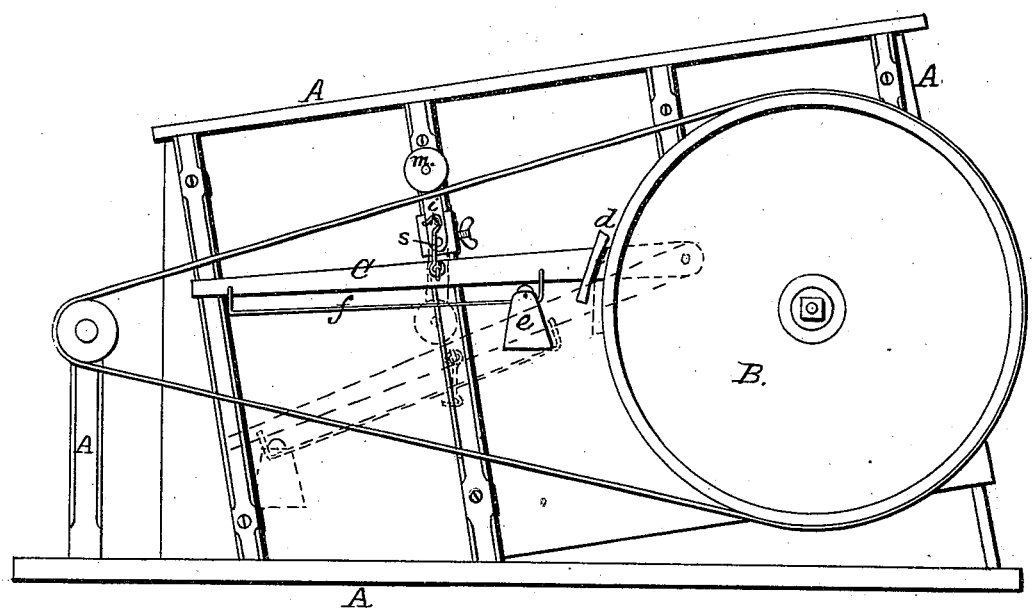

UNITED STATES PATENT OFFICE.

JOHN T. WHEELER, OF NEWTON, NEW JERSEY.

IMPROVEMENT IN AUTOMATIC BRAKES FOR TREAD-POWERS.

Specification forming part of Letters Patent No. 174,600, dated March 7, 1876; application filed February 19, 1876.

*To all whom it may concern:*

Be it known that I, JOHN T. WHEELER, of Newton, Sussex county, New Jersey, have invented an Improvement in Automatic Brakes for Tread-Powers; and I do hereby declare the following to be a full and correct description of the same, reference being had to the accompanying drawings, in which the figure is a side view of a tread-power, showing the application of my invention.

The object of my invention is to apply to the brake of an ordinary tread-power an apparatus which will automatically apply the brake to the driving-wheel in case the belt breaks or slips off, and thus arrest the motion of the driving apparatus, and prevent injury to the animals or machinery; and it consists in hanging the lever of the brake from a pulley traveling upon the belt, in such a manner that if the belt should become disarranged the pulley would fall and detach the lever, and a sliding weight would press the brake upon the wheel and stop the motion of the machine.

In the drawings, A represents the base and frame-work of an ordinary tread-power, and B the driving-wheel. Pivoted behind the wheel B is the lever C of the brake $d$, extending along the side of the frame A.

Thus far the construction is the same as the ordinary tread-power and brake; but the remainder of this description refers to my invention.

Underneath the lever C of the brake $d$ is a rod, $f$, extending nearly the whole length of the brake-lever C, upon which is hung the weight $e$ by means of a friction-pulley traveling upon the rod $f$. Secured to the frame A by means of a screw-clamp is a short lever, $i$, pivoted to said screw-clamp at one end, and holding the bearing of the traveling pulley $m$ at the other. Upon the outside surface of the lever $i$, between the pivot and pulley, is a short hook, rounded off at the heel, to which is to be attached the larger hook S, linked to the brake-lever C underneath the traveling pulley $m$.

The operation of my invention is as follows: When the machine is at its normal condition the pulley $m$ is traveling upon the belt, with the short lever $i$ in an upright position, the hook S hooked upon the short hook upon the lever $i$, and the weight $e$ moved up near the driving-wheel B. In this position the power may run until the belt breaks or is cast, when the pulley $m$, unsupported, will fall to one side or the other by the lever $i$ turning upon its pivot, and the short hook S will release the hook S holding up the lever C. This will allow the brake-lever C to fall, the weight $e$ to slide upon the rod $f$ out to the end of the lever, and the brake $d$ to press against the wheel B and stop the machine.

In tread-powers where my invention is not used, if an accident, like the breaking of the belt, should occur, the horses are often injured by the rapidity which the machine attains before it can be stopped.

Having thus fully described my invention, what I claim, and desire to secure by Letters Patent, is—

In combination with the driving-wheel and brake of an ordinary tread-power, the traveling pulley $m$, lever $i$, hook S, and sliding weight $e$, substantially as and for the purpose described.

The above specification of my said invention signed and witnessed at Newton, New Jersey, this 24th day of January, A. D. 1876.

JOHN T. WHEELER.

Witnesses:
MARTIN R. SHINER,
A. SHINER.